United States Patent
Myman

(10) Patent No.: US 11,861,030 B1
(45) Date of Patent: Jan. 2, 2024

(54) TECHNOLOGY PLATFORM FOR PROVIDING SECURE GROUP-BASED ACCESS TO SETS OF DIGITAL ASSETS

(71) Applicant: DatChat, Inc., New Brunswick, NJ (US)

(72) Inventor: Darin Myman, Howell, NJ (US)

(73) Assignee: DatChat, Inc., New Brunswick, NJ (US)

( * ) Notice: Subject to any disclaimer, the term of this patent is extended or adjusted under 35 U.S.C. 154(b) by 0 days.

(21) Appl. No.: 18/451,449

(22) Filed: Aug. 17, 2023

(51) Int. Cl.
*G06F 21/62* (2013.01)
*G06T 19/00* (2011.01)

(52) U.S. Cl.
CPC ........ *G06F 21/6218* (2013.01); *G06T 19/003* (2013.01); *G06F 2221/2113* (2013.01); *G06F 2221/2117* (2013.01); *G06F 2221/2141* (2013.01); *G06T 2219/024* (2013.01)

(58) Field of Classification Search
CPC ............. G06T 19/003; G06T 2219/024; G06F 21/6218; G06F 2221/2113; G06F 2221/2117; G06F 2221/2141
See application file for complete search history.

(56) References Cited

U.S. PATENT DOCUMENTS

| | | | | |
|---|---|---|---|---|
| 10,521,025 B2 * | 12/2019 | Powderly | ............ | G06F 3/04815 |
| 11,003,133 B2 * | 5/2021 | Johnson | ............... | G08B 15/002 |
| 11,282,066 B1 * | 3/2022 | Spender | ................ | G06T 19/006 |
| 11,507,204 B2 | 11/2022 | Powderly | | |
| 2011/0277016 A1 * | 11/2011 | Hockings | ................ | G06F 21/41 |
| | | | | 726/8 |
| 2012/0173655 A1 * | 7/2012 | McEntee | ............... | G06F 16/951 |
| | | | | 709/216 |
| 2013/0297692 A1 * | 11/2013 | Raji | ..................... | H04L 65/403 |
| | | | | 709/204 |
| 2014/0310351 A1 * | 10/2014 | Danielson | ............. | H04L 65/403 |
| | | | | 709/204 |
| 2016/0188585 A1 * | 6/2016 | Durham | ............... | H04N 13/351 |
| | | | | 345/633 |
| 2018/0232937 A1 * | 8/2018 | Moyer | .................. | G06T 15/005 |
| 2018/0350144 A1 * | 12/2018 | Rathod | ............. | G06Q 20/3224 |
| 2019/0089717 A1 * | 3/2019 | Dolev | .................. | H04L 9/0866 |
| 2019/0128676 A1 * | 5/2019 | Naik | ..................... | G01C 21/206 |
| 2019/0228348 A1 * | 7/2019 | O'Keefe-Sally | ....... | G06Q 10/02 |
| 2019/0386950 A1 * | 12/2019 | Chang | ..................... | H04L 51/56 |
| 2020/0193062 A1 * | 6/2020 | Sanders | ............. | G06F 16/2282 |

(Continued)

*Primary Examiner* — Gary S Gracia
(74) *Attorney, Agent, or Firm* — Sheppard Mullin Richter & Hampton LLP

(57) ABSTRACT

Various embodiments include a secure access system that provides secure group-based access to sets of digital assets. The system may allow a user to upload digital assets to the system for secure access by other users, and may allow a user to remove digital assets from the system as well. The assets may be associated with a family, and may be stored as a "family album". The system may issue a secure credential to family members for accessing the family album. A family member may invite another family or individual to view the family album. On acceptance of the invitation, the system may automatically forward the secure credential to the invited family or individual. The invited family or individual may use the secure credential to access the family album with no further action required by the invited family or individual.

17 Claims, 11 Drawing Sheets

(56) References Cited

U.S. PATENT DOCUMENTS

| | | | |
|---|---|---|---|
| 2020/0250339 A1* | 8/2020 | Rosedale | G06T 19/006 |
| 2020/0294293 A1* | 9/2020 | Boenig, II | G06T 11/60 |
| 2021/0019944 A1* | 1/2021 | McKeever | G06T 19/006 |
| 2021/0112073 A1* | 4/2021 | Schulz | H04L 63/065 |
| 2021/0201030 A1* | 7/2021 | Ju | G06V 20/20 |
| 2021/0343086 A1* | 11/2021 | Long, III | G16H 20/70 |
| 2022/0201049 A1* | 6/2022 | Jamison | H04L 65/403 |
| 2022/0295014 A1* | 9/2022 | Dhawan | G06T 19/006 |
| 2022/0391618 A1* | 12/2022 | Moton, Jr. | G06F 16/9035 |
| 2022/0414272 A1* | 12/2022 | Karri | G06F 21/602 |
| 2023/0102546 A1* | 3/2023 | McLean | H04L 63/102 |
| | | | 709/204 |
| 2023/0131071 A1* | 4/2023 | Yu | H04L 9/3073 |
| | | | 380/28 |
| 2023/0139813 A1* | 5/2023 | Thiel | G06F 21/31 |
| | | | 726/7 |
| 2023/0188329 A1* | 6/2023 | Yeo | H04L 9/0643 |
| | | | 713/193 |

* cited by examiner

TECHNOLOGY PLATFORM FOR PROVIDING SECURE GROUP-BASED ACCESS TO SETS OF DIGITAL ASSETS

DESCRIPTION OF RELATED ART

The disclosed technology relates generally to user access control, and more particularly some embodiments relate to managing such access control for groups of users.

SUMMARY

Various aspects of the invention relate to a technology platform that provides secure group-based access to sets of digital assets. The platform may be referred to as a "secure access system." The secure access system may allow a user to upload digital assets to the system for secure access by other users. Importantly, the system may also allow a user to remove digital assets from the system. In contrast, existing platforms do not allow uploaded assets to be removed. According to the terms of service, such platforms own and control the uploaded digital assets, and may prevent users from removing them from the platform.

The assets may be associated with a family, and may be stored as a "family album". The system may issue a secure credential to family members for accessing the family album. A family member may invite another family or individual to view the family album. On acceptance of the invitation, the system may automatically forward the secure credential to the invited family or individual. In contrast to current systems, the secure credential may be provided with no further action required by the invited family or individual.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
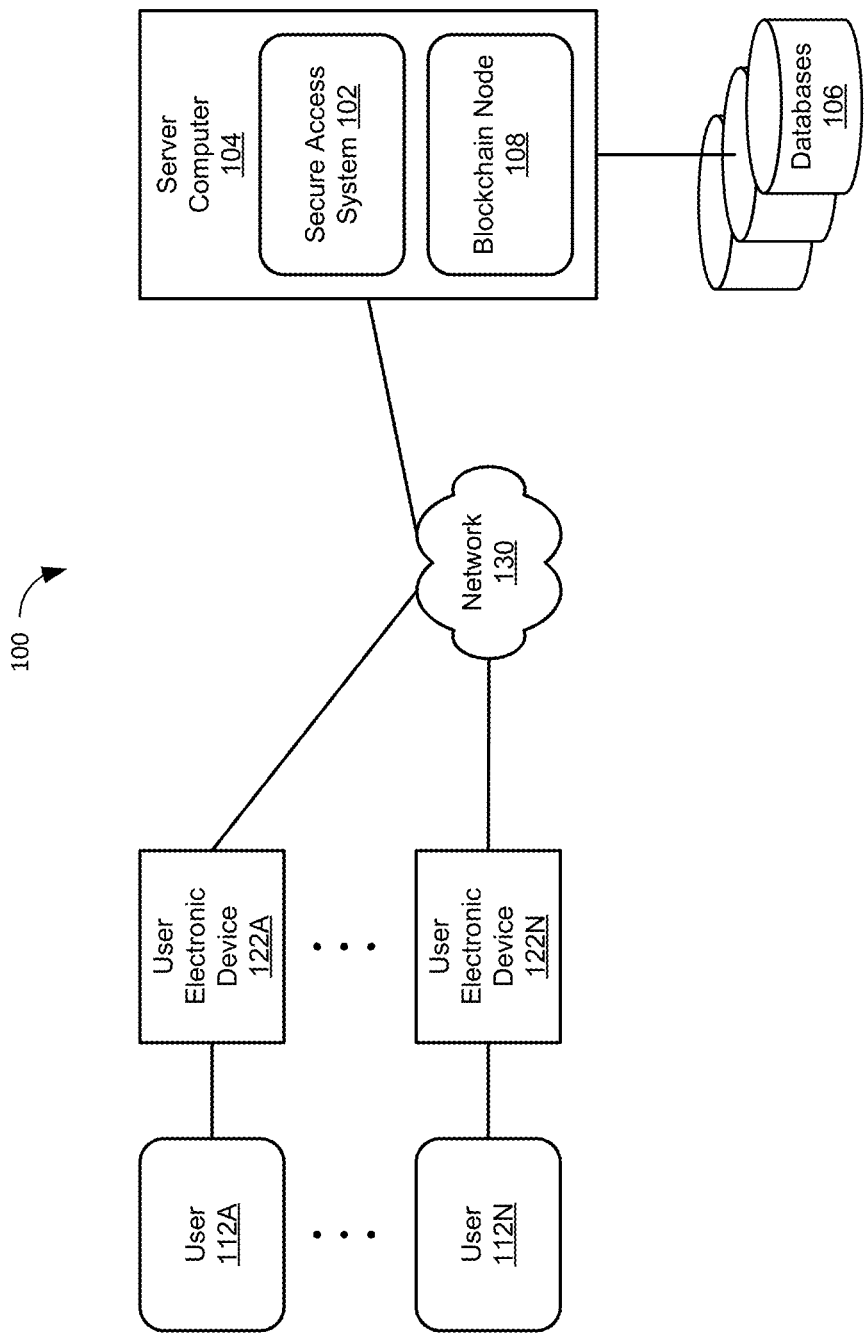
FIG. 1 illustrates a system for providing secure group-based access to sets of digital assets according to some embodiments of the disclosed technology.

The figures are not exhaustive and do not limit the present disclosure to the precise form disclosed.

DETAILED DESCRIPTION

Families and other groups enjoy collecting photographs, videos, documents, and other memorabilia. The current trend is for these items to take the form of digital assets, which are far easier to copy and share than their physical counterparts. But current sharing techniques suffer several drawbacks. One way is to transmit the digital asset electronically from person to person. Another is to simply display the digital asset on an electronic device, and then share the device itself, for example by passing a smartphone from person to person. These methods are inefficient, and may fail to preserve access to the digital assets in the future.

Newer sharing methods employ cloud accounts or social media accounts. But cloud accounts are generally password-protected. And while a social media user may wish to share some digital assets with some other users, the social media user may not wish to share all of the social media associated with the account. Furthermore, should the user become incapacitated, access to the digital assets may be lost.

The disclosed technologies provide a technology platform that provides secure group-based access to sets of digital assets, which is referred to herein as a "secure access system." The system may allow a user to upload digital assets to the system for secure access by other users. The system may also allow a user to remove digital assets from the system. The system may receive a request to provide, to a group of users, secure access to a set of digital assets. For example, a family member may request secure access be established for members of the family to access a set of digital photos, which may be referred to as a "family album."

Continuing this example, in response to the request, the system may generate a secure credential, associate that secure credential with the family album, and distribute the secure credential to the members of the family. Later, the system may receive a request to view the family album. The request may include the secure credential. Upon verifying the secure credential, the system may provide views of the digital assets to the requester.

In some cases, it may become desirable to enable other individuals or groups to view the digital assets. For example, one of the family members may marry, and may wish the spouse's family to have access to the family album. With prior techniques it may be necessary to create new user accounts, share passwords, and employ similar methods to provide this access. Embodiments of the disclosed technology may provide this access in a simpler manner.

The system may allow a member of the family to invite a new individual or group to be linked to the family. Upon acceptance of the invitation, the system may provide the secure credential to the identified individual or group automatically without user intervention. The individual or group members may now access the family album in the same way as the family members. In some embodiments, this capability is extended to the new members. That is the user or members of the user group that has been linked to the family may invite another new individual or group to be linked to the family.

Some embodiments employ virtual reality technology to transform the family album into a family museum. In these embodiments, the digital assets are represented by virtual objects in a virtual structure in a virtual three-dimensional environment such as a virtual museum, which may be referred to herein as a "family museum." For example, digital photos may be represented as framed pictures hanging on the walls of the interior of the museum. The system may provide virtual access to the family museum as before, in response to receiving a request and verifying the secure credential.

In some embodiments, the virtual museum may have multiple wings, each with separate access control according to respective secure credentials. In these embodiments, a family may have access to the entire museum, while others may have access to only a single wing. Other arrangements are contemplated.

FIG. 1 illustrates a system 100 for providing secure group-based access to sets of digital assets according to some embodiments of the disclosed technology. The system 100 may include a secure access system 102, which may be implemented as one or more software packages executing on one or more server computers 104. In some embodiments, the server 104 may implement a blockchain node 108. In some embodiments, the system may access blockchain nodes implemented elsewhere.

The system may include one or more databases 106. The databases 106 may store digital assets, secure credentials, family museum layouts, user information, and similar data.

Users 112A-N may access the secure access system 102 with user electronic devices 122A-N over a network 130. Each client user electronic device 122 may be implemented as a desktop computer, laptop computer, smart phone, smart glasses, embedded computers and displays, and similar electronic devices.

In some embodiments, the system may be operable to generate non-fungible tokens (NFTs) for the digital assets, and to record these NFTs on a blockchain. In some embodiments, the system may be operable to generate NFTs for the albums and museums, and to record these NFTs on a blockchain. In some embodiments, the digital assets may be stored in a decentralized manner that is managed by a blockchain. In some embodiments, the system may encrypt the digital assets for additional security.

Figure 2:
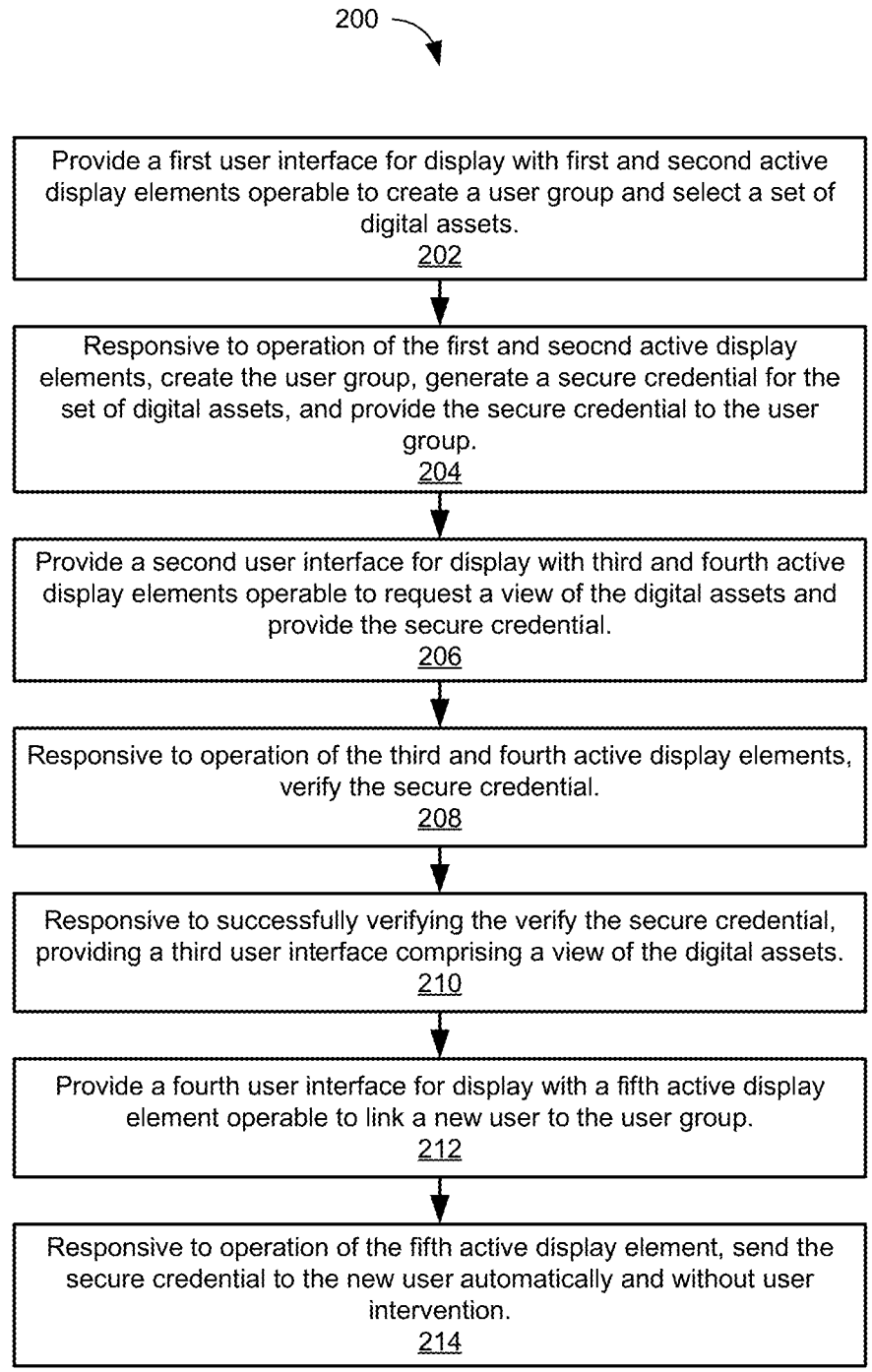
FIG. 2 is a flowchart illustrating a process for providing secure group-based access to sets of digital assets, according to some embodiments of the disclosed technology.

FIG. 2 is a flowchart illustrating a process 200 for providing secure group-based access to sets of digital assets, according to some embodiments of the disclosed technology. For example, the process 200 may be employed in the system 100 of FIG. 1.

The elements of the process 200 are presented in one arrangement. However, it should be understood that one or more elements of the process may be performed in a different order, in parallel, omitted entirely, and the like. Furthermore, the process 200 may include other elements in addition to those presented. For example, the process 200 may include error-handling functions for exceptions.

The process 200 may include providing a first user interface for display, at 202. The first user interface may include a first active display element operable to create a user group of users. The first user interface may include a second active display element operable to select a set of digital assets. For example, this operation may enable a user to create a user group of family members, and to select a collection of photographs to share with the group as a family album.

Referring again to FIG. 2, the process 200 may include, responsive to operation of the first and second active display elements of the first user interface: generating a secure credential, associating the secure credential with the set of digital assets, and providing the secure credential to the users in the user group, at 204. This operation may provide the family members with secure access to the family album. Referring to FIG. 1, the secure access system 102 may store the set of digital assets in association with the secure credential in databases 106.

Referring again to FIG. 2, the process 200 may include providing a second user interface for display, at 206. The second user interface may include a third active display element operable to request to view the set of digital assets. The second user interface may include a fourth active display element operable to provide the secure credential. This operation may allow a family member to request access to the family album by providing the secure credential generated at 204.

The process 200 may include verifying the secure credential responsive to operation of the third and fourth active display elements, at 208. For example, referring to FIG. 1, the secure access system 102 may compare the secure credential provided by the requesting user to the secure credential stored in the databases 106.

Referring again to FIG. 2, the process 200 may include providing a third user interface for display responsive to successfully verifying the secure credential, at 210. The third user interface may include a view of the set of digital assets. For example, the user interface may include the set of family photographs.

The process 200 may include providing a fourth user interface for display, at 212. The fourth user interface comprising a fifth active display element operable to link a new user to the user group of users. This operation may allow a family member to link another user or group of users with the family for the purpose of accessing the family photographs. For example, when a member of the family marries, that member may link the family to the spouse and the spouse's family. In some cases, the system may require a user to accept an invitation before allowing the user to be linked.

The process 200 may include, responsive to operation of the fifth active display element, sending the secure credential to the new user automatically without user intervention, at 214. This operation may automatically provide the user groups secure credential to the new user without user intervention responsive to the linking. Continuing the example, the system may provide the secure credential to the linked spouse and the spouse's family. In contrast to current systems, the secure credential may be provided without any further actions by the family members, the spouse, or the spouse's family.

Figure 3:
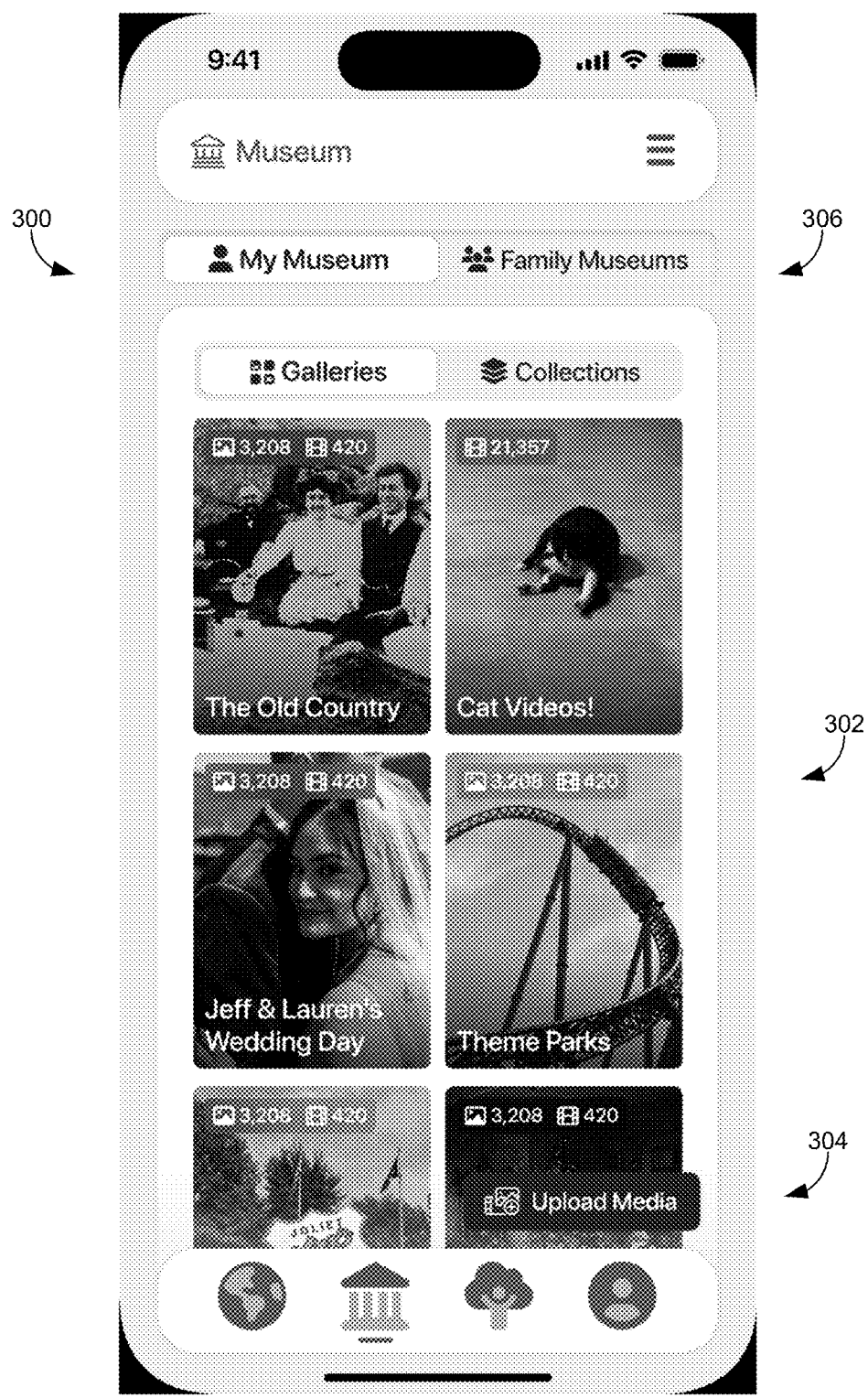
FIG. 3 illustrates a "my museum" user interface according to some embodiments of the disclosed technology.

In some embodiments, the user interfaces may be two-dimensional. FIGS. 3-11 show example user interfaces according to these embodiments. FIG. 3 illustrates a "my museum" user interface 300 according to some embodiments of the disclosed technology. Each user may have a museum, which may have one or more sets of digital assets. Each set may be referred to as a "gallery" or a "wing" of a museum. The "my museum" user interface 300 includes multiple active display elements. The active display elements include display elements 302 for selecting the galleries. The active display elements include an active display element 304 operable to upload additional digital assets to the system. For example, the active display element 304 may be operated to upload photos and videos. The display elements include a display element 306 for selecting museums of other family members.

Figure 4:
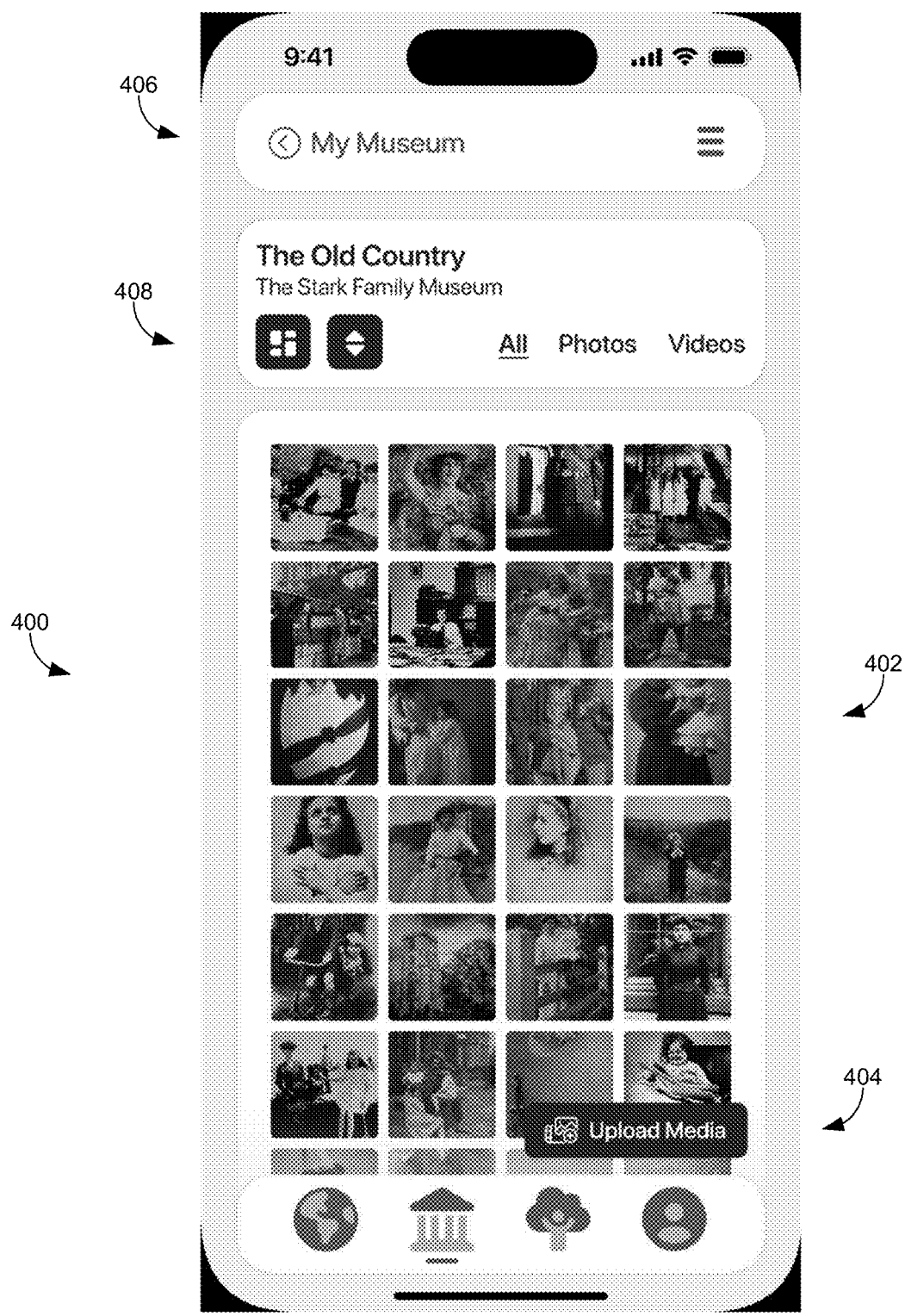
FIG. 4 illustrates a "gallery" user interface according to some embodiments of the disclosed technology.

FIG. 4 illustrates a "gallery" user interface 400 according to some embodiments of the disclosed technology. The "gallery" user interface 400 includes multiple active display elements. In this example, the active display elements include active display elements 402 in the form of thumbnails of photos and videos that can be selected for viewing. The active display elements include an active display element 404 operable to upload additional digital assets to the gallery. The active display elements may include an active display element 406 operable to return to the "my museum" user interface. The active display elements may include an active display element 408 operable to change the grid layout for the thumbnails.

Figure 5:
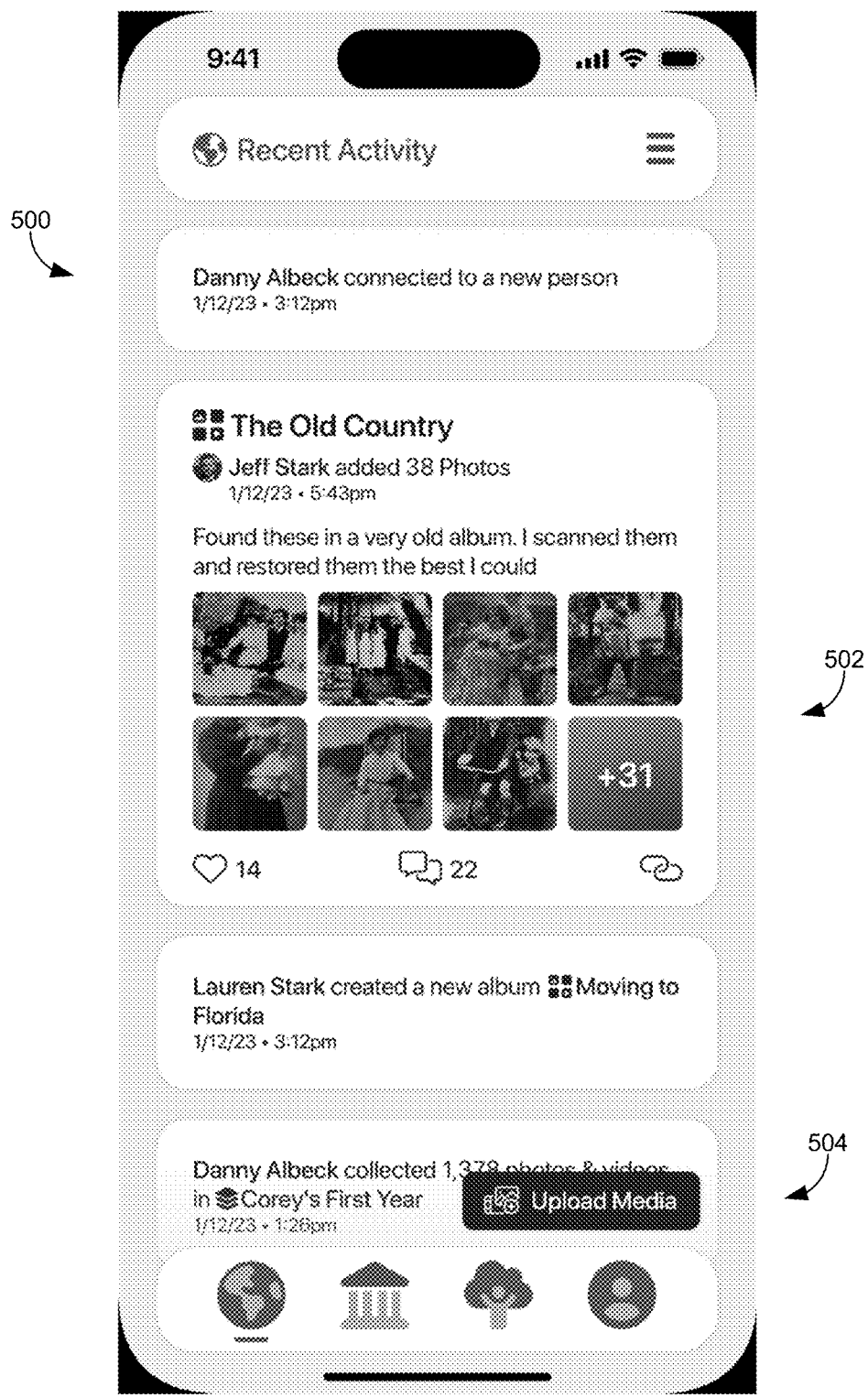
FIG. 5 illustrates a "recent activity" user interface according to some embodiments of the disclosed technology.

FIG. 5 illustrates a "recent activity" user interface 500 according to some embodiments of the disclosed technology. The "recent activity" user interface 500 includes multiple active display elements. In this example, the active display elements include active display elements 502 that indicate recent activity including messages sent, new connections between users, the creation of new albums, and milestones. The active display elements may include an active display element 504 operable to upload additional digital assets to the system.

In some embodiments, users may not be allowed to post to the "recent activity" user interface 500 of other users. Instead, the user interface 500 reflects activity of users. A user may select or exclude groups of users from which activity should be posted to the user interface 500. Users may be allowed to comment on activity posted to the user interface 500, including the owner.

Figure 6:
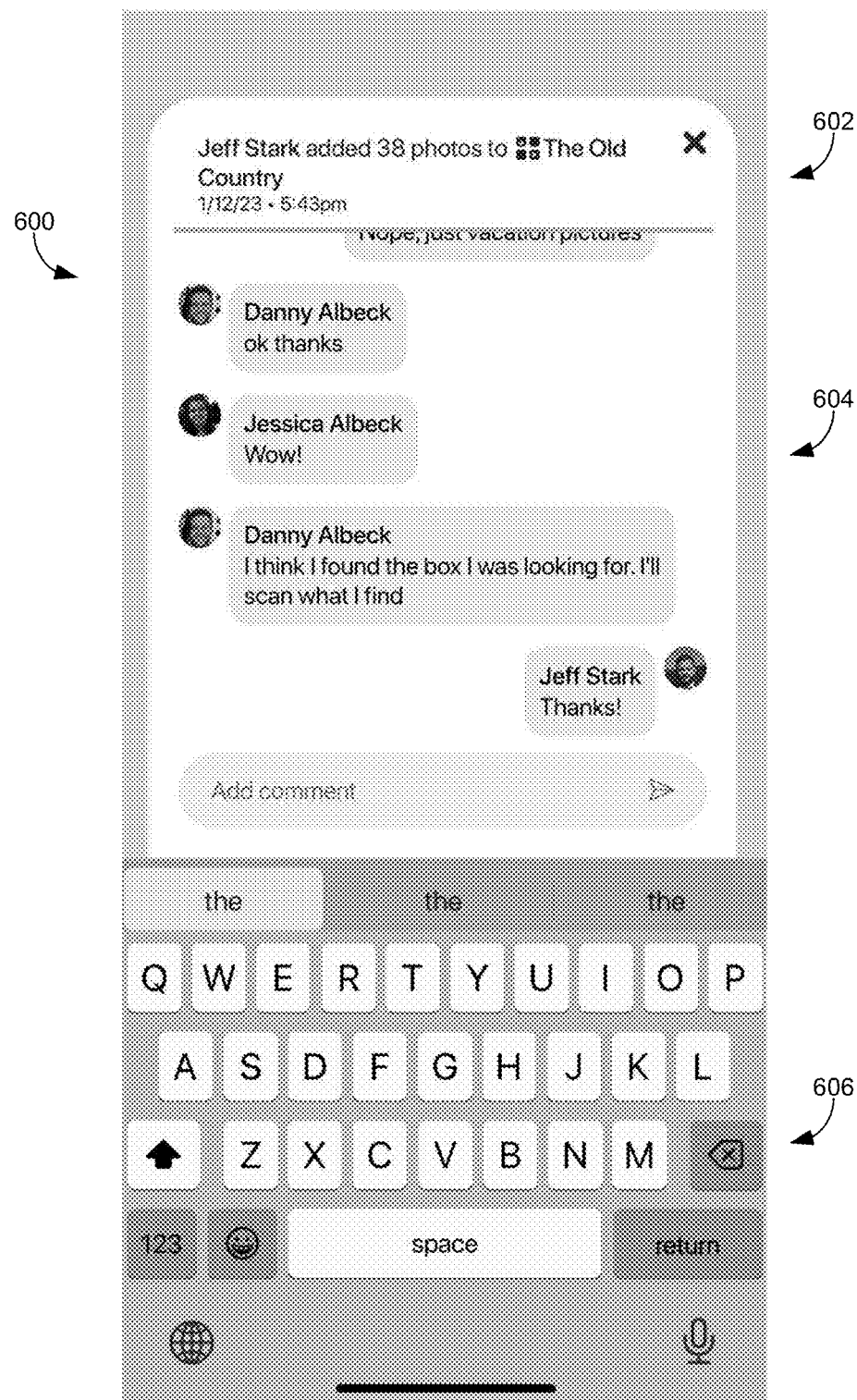
FIG. 6 illustrates a "comments" user interface according to some embodiments of the disclosed technology.

FIG. 6 illustrates a "comments" user interface 600 according to some embodiments of the disclosed technology. The "comments" user interface 600 includes multiple active display elements. In this example, the active display elements include a display area 602 for displaying the subject of the comments, a display area 604 for displaying the comments, and a keyboard 606 for entering new comments.

Figure 7:
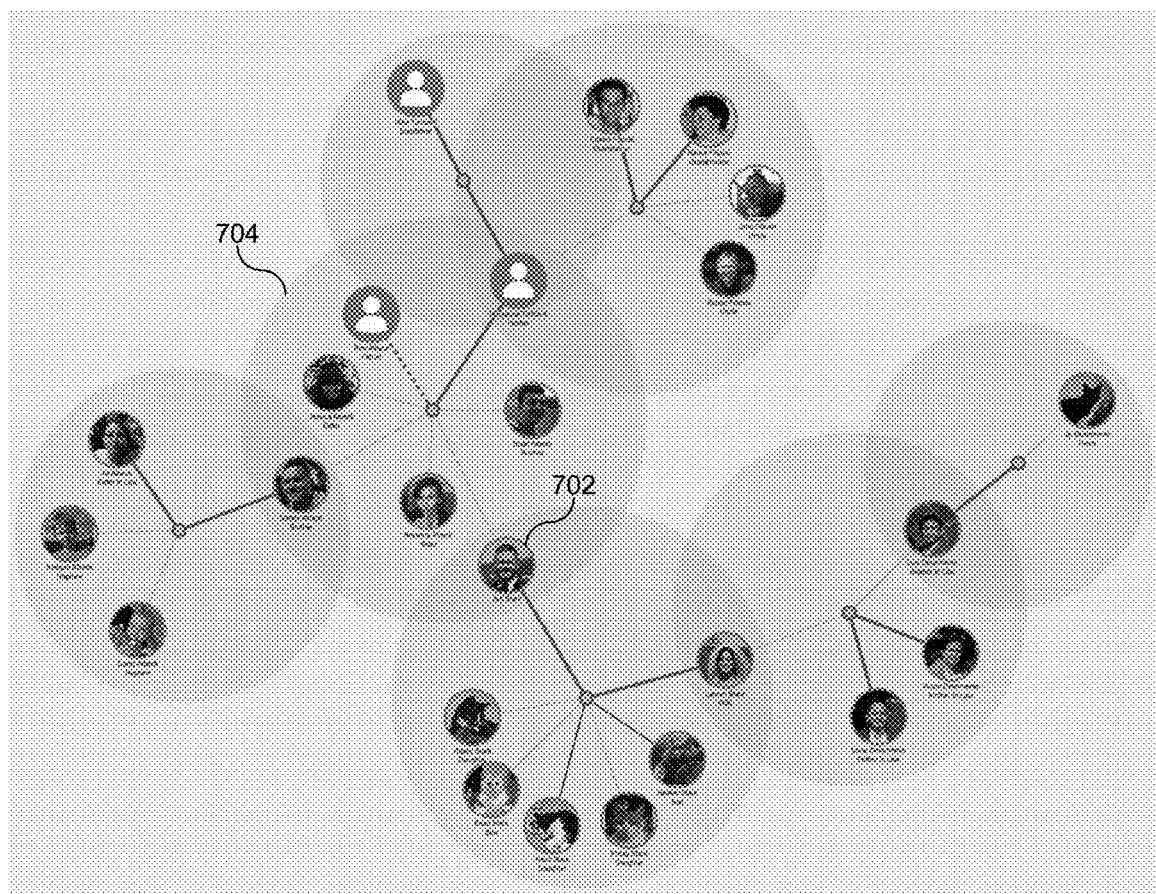
FIG. 7 illustrates a "family tree" user interface according to some embodiments of the disclosed technology.

FIG. 7 illustrates a "family tree" user interface 700 according to some embodiments of the disclosed technology. The "family tree" user interface 700 includes multiple active display elements. In this example, the active display elements include active display elements 702 representing individuals. Each of these active display elements may include a photograph, a name, and a relationship designator such as "brother" or "wife". Each of these active display elements may be operable to open a "family tree popup" user interface for the respective user, or to add a new user or user group. Groups of users such as families may be indicated by large circles 704 encompassing two or more users.

In some embodiments, each circle 704 may represent an immediate family, and visual features of the lines radiating from the central nodes in the circles may represent the relation of the connected persons within the immediate family. For example, thick lines may represent parents, and thin lines may represent children and siblings. Broken and colored lines may represent statuses such as divorce, adoption, and death. The lines may be implemented as active display elements operable by a user to change the relationship or status, or to remove or "prune" a user or an entire branch from the family tree.

In some embodiments, the system updates the "family tree" user interface 700 automatically upon the happening of a predetermined event. For example, when a new connected person is added, the system may automatically update the "family tree" user interface 700 to include that person.

Figure 8:
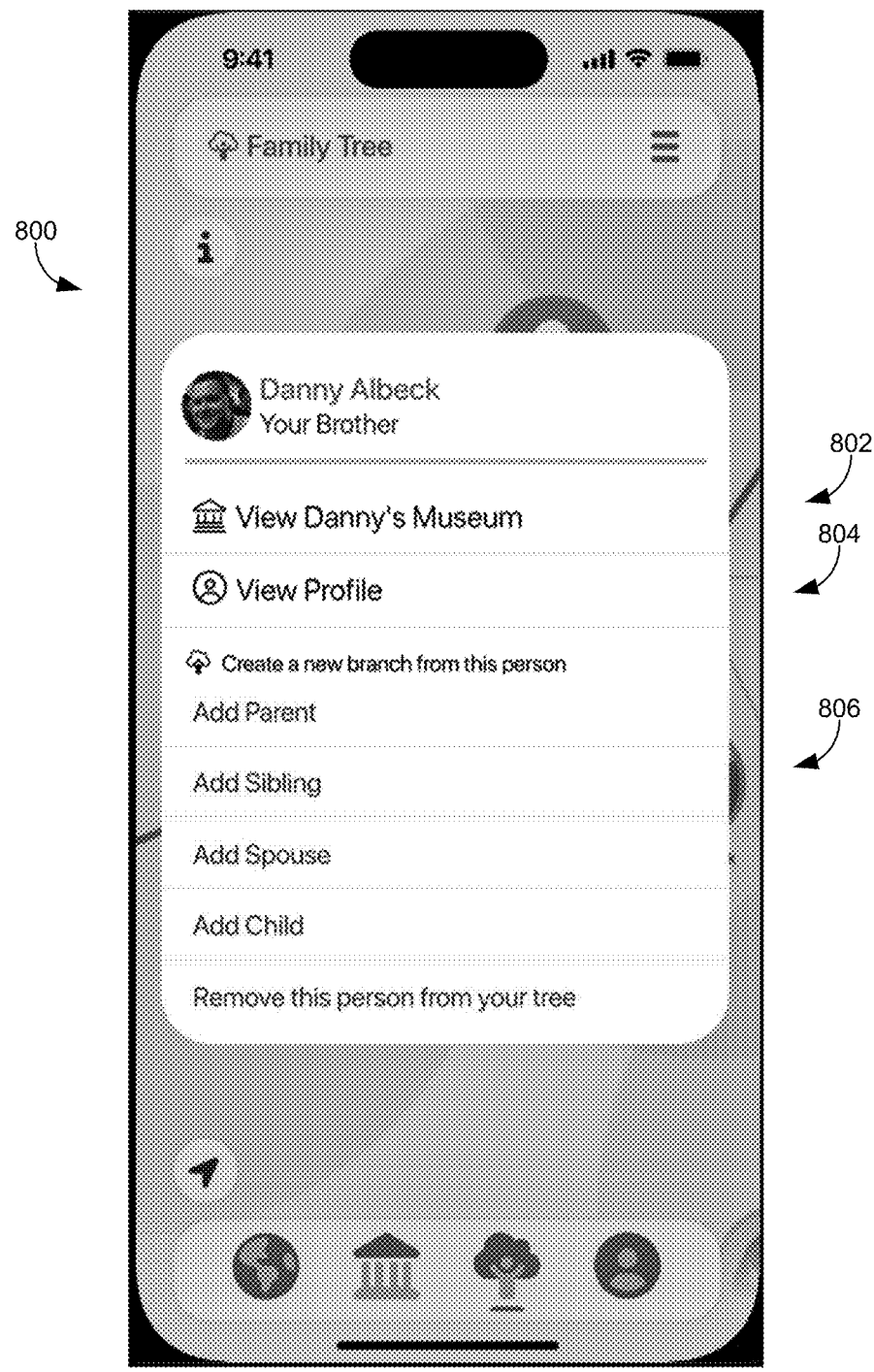
FIG. 8 illustrates a "family tree popup" user interface according to some embodiments of the disclosed technology.

FIG. 8 illustrates a "family tree popup" user interface 800 according to some embodiments of the disclosed technology. The "family tree popup" user interface 800 relates to a particular user, and includes multiple active display elements. One active display element 802 is operable to view the user's museum. Another active display element 804 is operable to view the user's profile. Other active display elements 806 are operable to add or remove group members such as family members.

Figure 9:
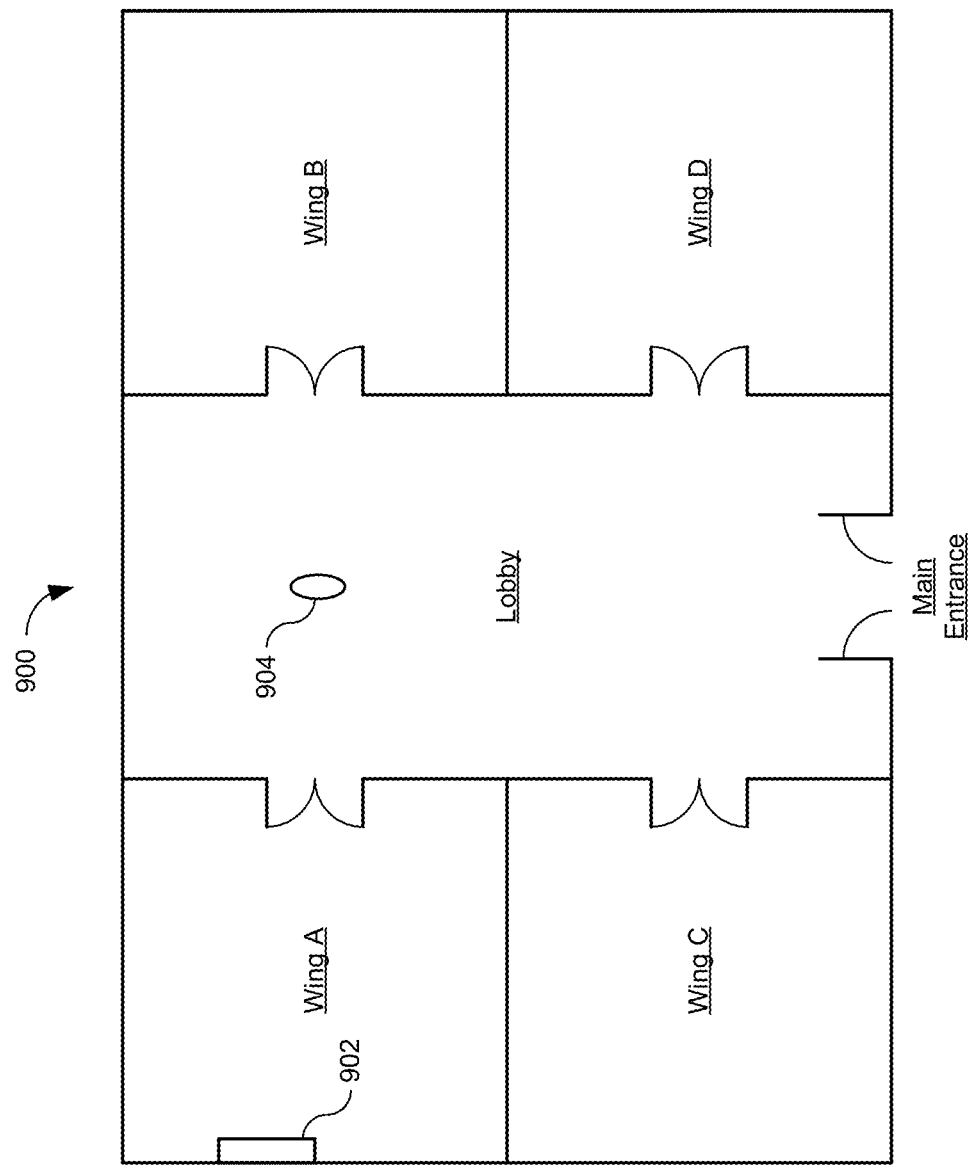
FIG. 9 illustrates a floor plan for a "family museum" according to some embodiments of the disclosed technology.

FIG. 9 illustrates a floor plan 900 for a "family museum" according to some embodiments of the disclosed technology. The family museum may be implemented as a virtual structure for browsing through virtual reality technology. Virtual objects within the virtual structure may non be visible outside the virtual structure. Access to the family museum may be restricted at the main entrance. The family museum may include a lobby that is open to anyone with access to the family museum. The family museum may include one or more wings, each with entrances that further restrict access. For example, the owner of the family museum may reserve wing A for family only, wing B for friends only, wing C for colleagues only by associating different secure credentials with each wing.

The lobby and wings may house virtual objects representing digital assets. For example, a family portrait 902 may hang on the wall of wing A, while a statue 904 may reside in the lobby.

The owner of the family museum may reconfigure it at will, for example to add, reconfigure, or remove wings; to add, remove, and move virtual objects; and to change access permissions for the wings. In some embodiments, the floor plan 900 may be implemented as a user interface having active display elements operable to perform these functions. In some embodiments, the owner may assign a role and permissions for modifying the family museum to another user, also referred to herein as a "moderator".

In some embodiments, the owner or moderator may associate a permission with a virtual object or wing that identifies at least one user and an action permitted by the user on the virtual object or wing. For example, a user may be permitted to crop a particular photograph. As another example, only family members may be permitted to download the digital assets represented by the virtual objects. Other permissions may include allowing screenshots of the virtual objects.

In some embodiments, users may be allowed to submit a reaction to one of the virtual objects. The system may associate the reaction with the virtual object, and may allow users to view the reaction, either automatically or by operating an active display element of a user interface.

In some embodiments, the system may include a feature to automatically remove duplicates of the digital assets. For example, a favorite wedding photo may be uploaded by multiple members of the family. The system may automatically remove all but one copy. Alternatively, the system may inform the owner of the museum of the duplicates, allowing the owner to invoke the process of removing the duplicates.

In some embodiments, the system may automatically tag uploaded digital assets. For example, the system may employ facial recognition technology to identify individuals in a photo, and may tag those individuals. In some embodiments, the system may notify individuals who have been tagged. As another example, the system may identify objects in photos and tag the photos according to the objects. For example, the system may tag a photo including a bride and groom as a wedding photo.

Figure 10:
FIG. 10 depicts a virtual reality view of an example family museum according to some embodiments of the disclosed technology.

As noted above, users may visit a family museum using virtual reality technology to obtain a three-dimensional experience. While visiting the museum, a user may be represented in the museum by an avatar, and may view avatars of other visitors. FIG. 10 depicts a virtual reality view of an example family museum according to some embodiments of the disclosed technology.

Figure 11:
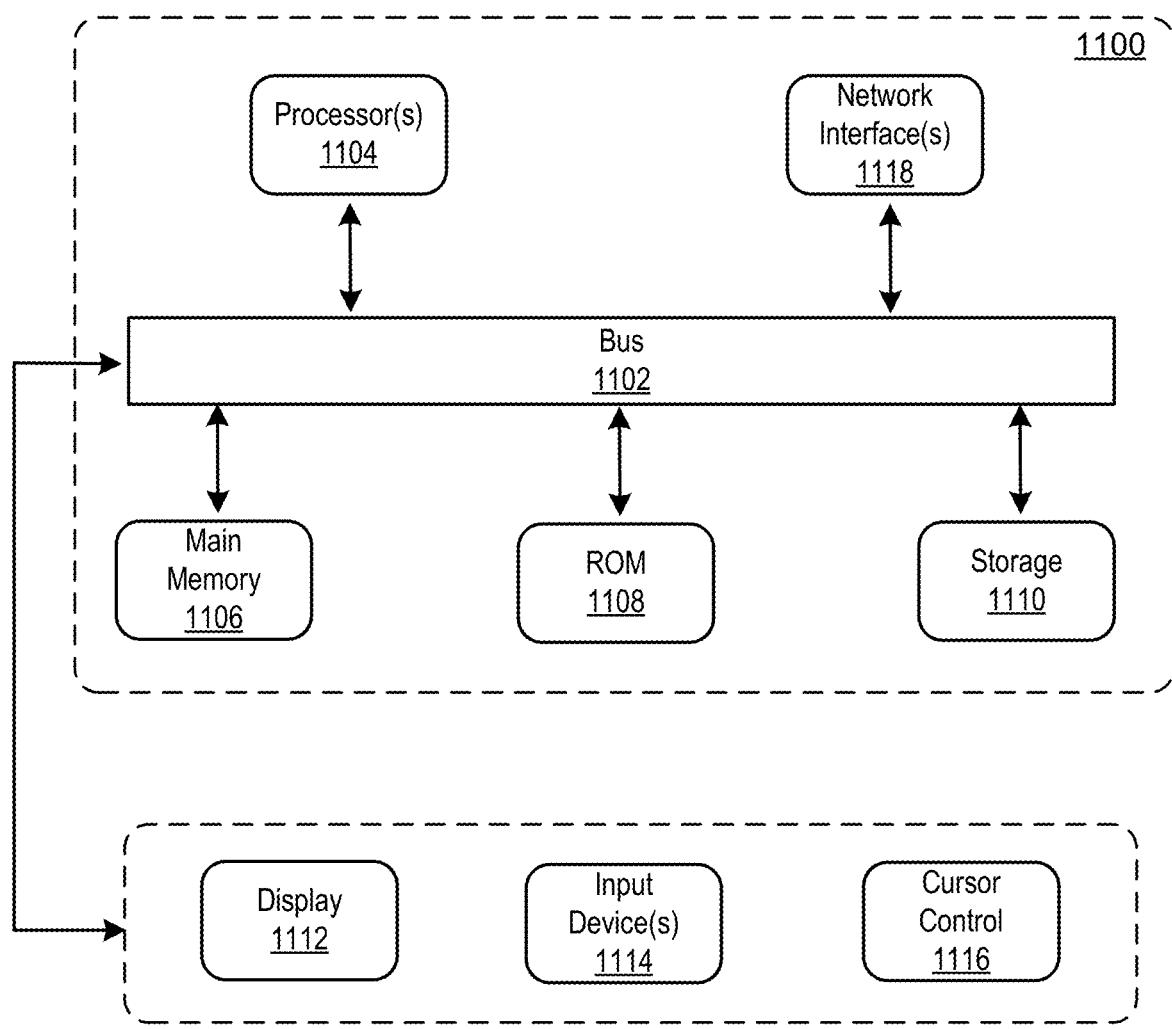
FIG. 11 is an example computing component that may be used to implement various features of embodiments described in the present disclosure.

FIG. 11 depicts a block diagram of an example computer system 1100 in which embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided or encoded on a computer readable or machine readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any non-transitory media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Network interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, network interface 1118 may be a local area network (LAN) card to provide a data communication connection to a compatible LAN (or a WAN component to communicate with a WAN). Wireless links may also be implemented. In any such implementation, network interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. For example, a method bay be referred to as a "computer-implemented" method. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalents.

What is claimed is:

1. A system for providing secure group-based access to sets of virtual objects, the system comprising:
   one or more hardware processors; and
   a non-transitory machine-readable storage medium encoded with instructions executable by the one or more hardware processors to perform operations comprising:
      providing a first user interface for display, the first user interface comprising a first active display element operable to create a user group of users and a second active display element operable to select a set of virtual objects contained within a virtual structure in a three-dimensional virtual environment, wherein the virtual objects are not visible outside the virtual structure;
      responsive to operation of the first and second active display elements:
         generating a secure credential,
         associating the secure credential with the set of virtual objects, and
         providing the secure credential to the users in the user group;

providing a second user interface for display, the second user interface comprising a third active display element operable to request to view the set of virtual objects and a fourth active display element operable to provide the secure credential;

verifying the secure credential responsive to operation of the third and fourth active display elements;

providing a third user interface for display responsive to successfully verifying the secure credential, the third user interface comprising a view of the set of virtual objects;

providing a fourth user interface for display, the fourth user interface comprising a fifth active display element operable to link a new user to the user group of users; and responsive to operation of the fifth active display element, sending the secure credential to the new user automatically without user intervention.

2. The system of claim 1, the operations further comprising:
generating non-fungible tokens for the virtual objects; and
recording the non-fungible tokens on a blockchain.

3. The system of claim 1, the operations further comprising:
providing virtual access to an interior of the virtual structure.

4. The system of claim 3, wherein:
the virtual structure comprises multiple wings;
the set of virtual objects is contained within one of the wings; and
the operations further comprise: associating the secure credential with the one of the wings; and
providing virtual access to an interior of the virtual structure comprises providing virtual access only to the one of the wings.

5. The system of claim 1, the operations further comprising:
assigning a moderator role to one of the users; and
permitting only the one of the users to modify the virtual objects.

6. The system of claim 1, the operations further comprising:
providing a fifth user interface for display, the fifth user interface comprising a sixth active display element operable to submit a reaction to one of the virtual objects;
responsive to operation of the sixth active display element, associating the reaction with the one of the virtual objects; and
enabling the reaction to be viewed with the one of the virtual objects.

7. The system of claim 1, the operations further comprising:
associating a permission with one of the virtual objects, wherein the permission identifies at least one user and at least one action permitted by the user on the one of the virtual objects.

8. A non-transitory machine-readable storage medium encoded with instructions executable by a hardware processor of a computing component, the machine-readable storage medium comprising instructions to cause the hardware processor to perform operations comprising:

providing a first user interface for display, the first user interface comprising a first active display element operable to create a user group of users and a second active display element operable to select a set of virtual objects contained within a virtual structure in a three-dimensional virtual environment, wherein the virtual objects are not visible outside the virtual structure;

responsive to operation of the first and second active display elements:
generating a secure credential,
associating the secure credential with the set of virtual objects, and
providing the secure credential to the users in the user group;

providing a second user interface for display, the second user interface comprising a third active display element operable to request to view the set of virtual objects and a fourth active display element operable to provide the secure credential;

verifying the secure credential responsive to operation of the third and fourth active display elements;

providing a third user interface for display responsive to successfully verifying the secure credential, the third user interface comprising a view of the set of virtual objects;

providing a fourth user interface for display, the fourth user interface comprising a fifth active display element operable to link a new user to the user group of users; and responsive to operation of the fifth active display element, sending the secure credential to the new user automatically without user intervention.

9. The non-transitory machine-readable storage medium of claim 8, the operations further comprising:
generating non-fungible tokens for the virtual objects; and
recording the non-fungible tokens on a blockchain.

10. The non-transitory machine-readable storage medium of claim 8, the operations further comprising:
providing virtual access to an interior of the virtual structure.

11. The non-transitory machine-readable storage medium of claim 10, wherein:
the virtual structure comprises multiple wings;
the set of virtual objects is contained within one of the wings; and
the operations further comprise: associating the secure credential with the one of the wings; and
providing virtual access to an interior of the virtual structure comprises providing virtual access only to the one of the wings.

12. The non-transitory machine-readable storage medium of claim 8, the operations further comprising:
assigning a moderator role to one of the users; and
permitting only the one of the users to modify the virtual objects.

13. The non-transitory machine-readable storage medium of claim 8, the operations further comprising:
providing a fifth user interface for display, the fifth user interface comprising a sixth active display element operable to submit a reaction to one of the virtual objects;
responsive to operation of the sixth active display element, associating the reaction with the one of the virtual objects; and
enabling the reaction to be viewed with the one of the virtual objects.

14. The non-transitory machine-readable storage medium of claim 8, the operations further comprising:
associating a permission with one of the virtual objects, wherein the permission identifies at least one user and at least one action permitted by the user on the one of the virtual objects.

15. A computer-implemented method comprising:
providing a first user interface for display, the first user interface comprising a first active display element operable to create a user group of users and a second active display element operable to select a set of virtual objects contained within a virtual structure in a three-dimensional virtual environment, wherein the virtual objects are not visible outside the virtual structure;
responsive to operation of the first and second active display elements:
generating a secure credential,
associating the secure credential with the set of virtual objects, and
providing the secure credential to the users in the user group;
providing a second user interface for display, the second user interface comprising a third active display element operable to request to view the set of virtual objects and a fourth active display element operable to provide the secure credential;
verifying the secure credential responsive to operation of the third and fourth active display elements;
providing a third user interface for display responsive to successfully verifying the secure credential, the third user interface comprising a view of the set of virtual objects;
providing a fourth user interface for display, the fourth user interface comprising a fifth active display element operable to link a new user to the user group of users; and
responsive to operation of the fifth active display element, sending the secure credential to the new user automatically without user intervention.

16. The computer-implemented method of claim 15, further comprising:
generating non-fungible tokens for the virtual objects; and
recording the non-fungible tokens on a blockchain.

17. The computer-implemented method of claim 15, further comprising:
providing virtual access to an interior of the virtual structure.

* * * * *